United States Patent
Harradine et al.

(12) 
(10) Patent No.: US 6,342,902 B1
(45) Date of Patent: *Jan. 29, 2002

(54) CONTROLLING AUDIO AND/OR VIDEO REPLAY

(75) Inventors: Vincent Carl Harradine, Basingstoke; Mark John McGrath, Bracknell, both of (GB)

(73) Assignees: Sony Corporation, Tokyo (JP); Sony United Kingdom Limited, Weybridge (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/831,614

(22) Filed: Apr. 9, 1997

(30) Foreign Application Priority Data

Dec. 4, 1996 (GB) .............................................. 9607642

(51) Int. Cl.[7] .................................................. G09G 5/00

(52) U.S. Cl. ........................ 345/716; 345/704; 345/784; 345/785; 345/786; 345/787; 345/720

(58) Field of Search ................................ 345/328, 159, 345/704, 723, 724, 725, 726, 727, 728, 729, 730, 731, 732, 784, 785, 786, 787, 716, 720

(56) References Cited

U.S. PATENT DOCUMENTS

| 5,202,961 | A |   | 4/1993  | Mills et al. ................. 345/328 |
| 5,237,648 | A |   | 8/1993  | Mills et al. ................. 345/433 |
| 5,564,005 | A |   | 10/1996 | Weber et al. ................ 345/326 |
| 5,760,767 | A | * | 6/1998  | Shore et al. ................. 345/328 |
| 5,950,211 | A | * | 12/1998 | Tognazzini ................. 345/158 |

FOREIGN PATENT DOCUMENTS

| EP | 0438299 A2 | 1/1991 |
| EP | 0 438 299  | 7/1991 |
| FR | 2663140    | 12/1991 |
| WO | WO 93/21595 | 10/1993 |

OTHER PUBLICATIONS

"Digital Video Direction and Speed Controls" IBM Technical Disclosure Bulletin, vol. 34, No. 6, Nov. 1, 1991, pp. 36–38.

* cited by examiner

*Primary Examiner*—Ba Huynh
(74) *Attorney, Agent, or Firm*—Frommer Lawrence & Haug LLP; William S. Frommer; Glenn F. Savit

(57) ABSTRACT

Apparatus for controlling replay of video and/or audio material comprises cursor control means for providing user control of a cursor on the display screen; selection control means for selecting an operation to be performed by the apparatus in dependence on the current position of the cursor on the display screen when the selection control means is activated by the user; means for defining a shuttle control display screen area for use in controlling shuttle replay operation; means for detecting an initial activation of the selection control means while the cursor is at an initial activation point within the shuttle control display screen area; and means, responsive to the detecting means, for controlling shuttle replay of the recorded material at a shuttle speed dependent on a current displacement on the display screen of the cursor from the initial activation point while the selection control means remains continuously activated after the initial activation.

11 Claims, 6 Drawing Sheets

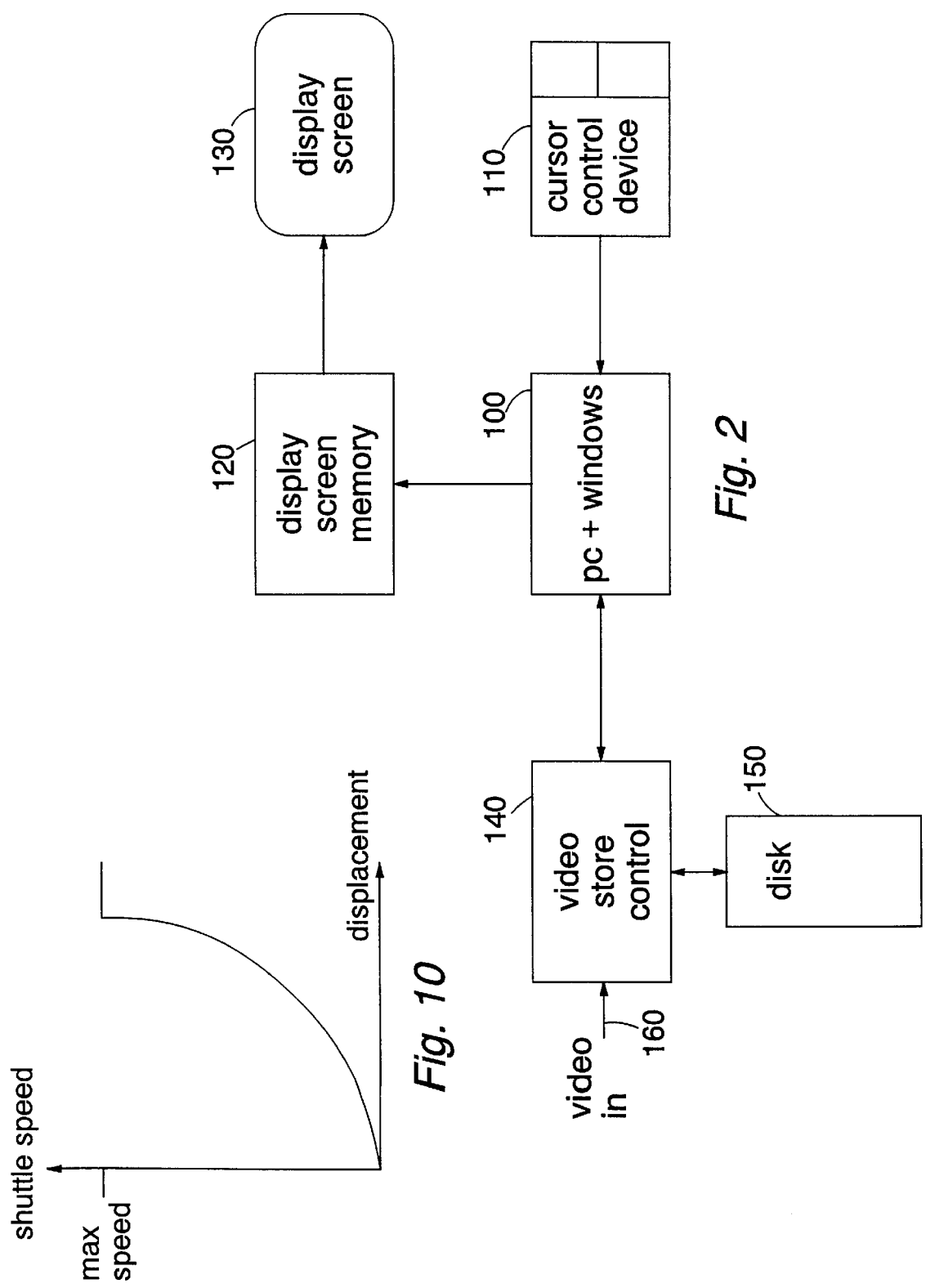

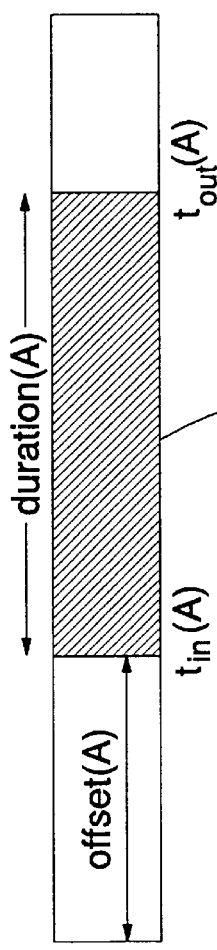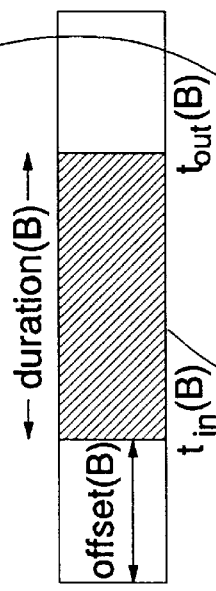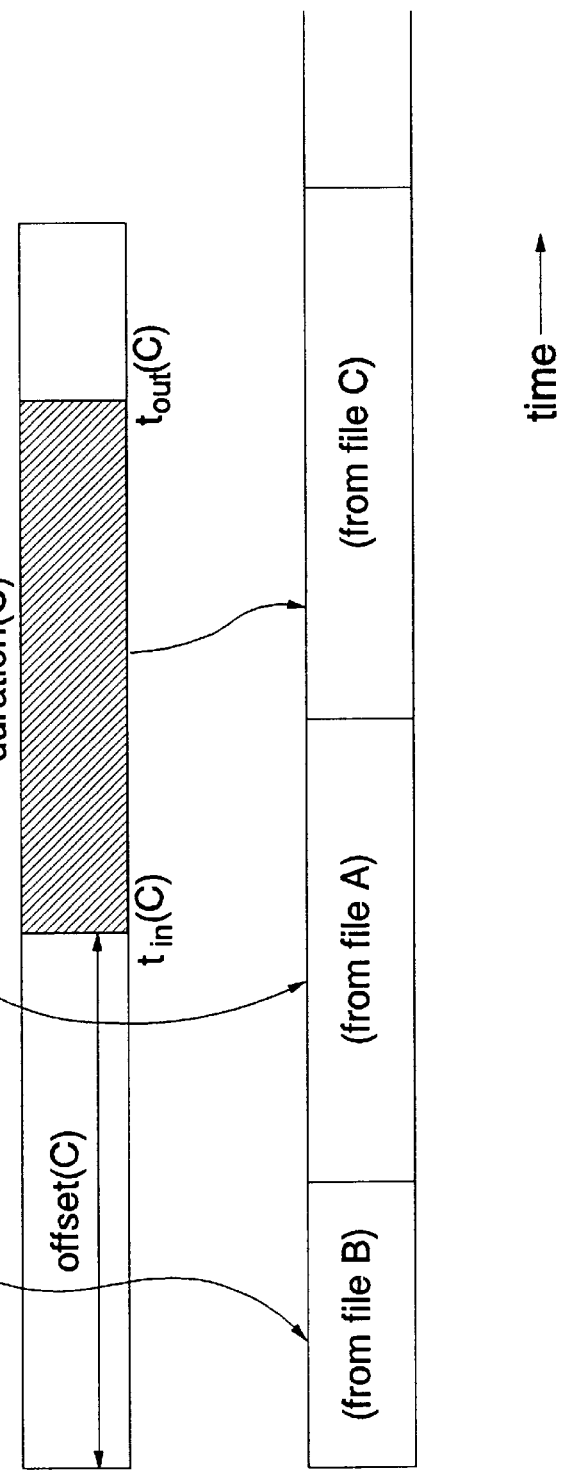
Fig. 3a
Fig. 3b
Fig. 3c
Fig. 3d

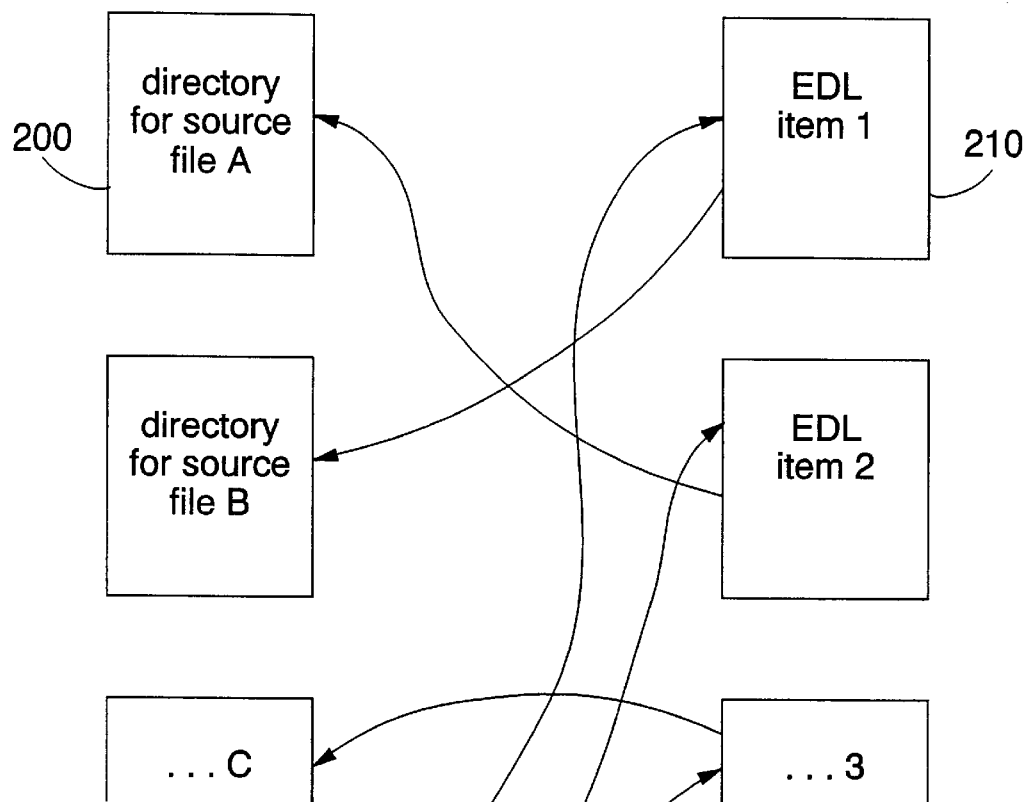
*Fig. 4a*           *Fig. 4b*
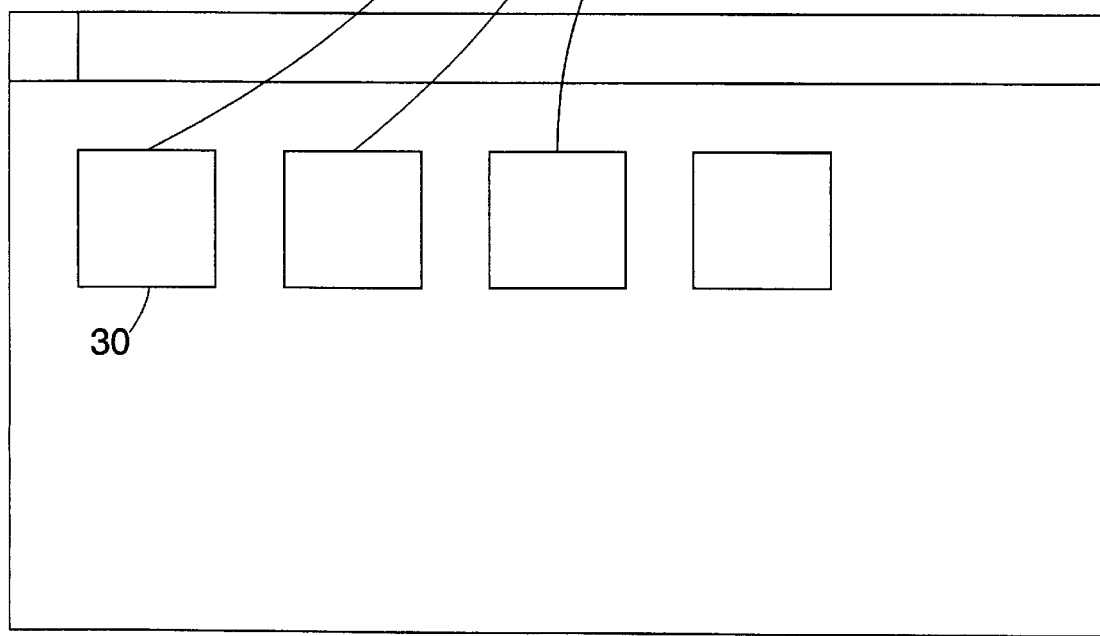
*Fig. 4c*

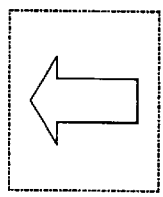 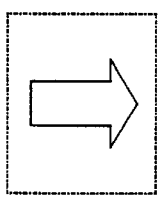 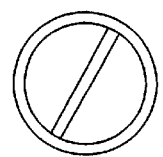
*Fig. 7a*  *Fig. 7b*  *Fig. 7c*
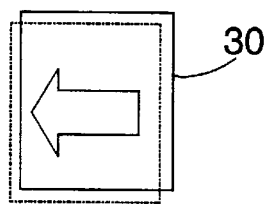 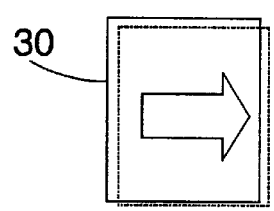
*Fig. 8a*  *Fig. 8b*
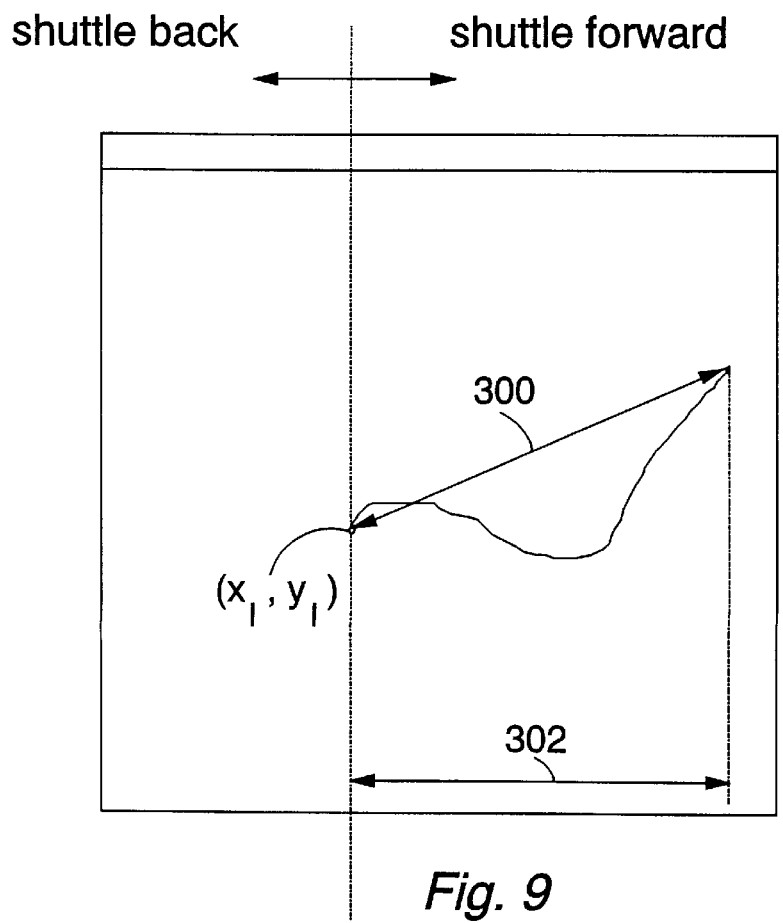
*Fig. 9*

CONTROLLING AUDIO AND/OR VIDEO REPLAY

BACKGROUND OF THE INVENTION

1. Field of the Invention

This invention relates to the control of audio and/or video replay, to replay controllers, and to audio and/or video reproducing devices.

2. Description of the Prior Art

Recently, computer-based video replay systems have become available, in which a recorded video signal is replayed to an area or window of a computer's display screen. The source of the video signal may be, for example, a video tape recorder (VTR), the computer's hard disk or a CD-ROM.

Various attempts have been made to simulate, with the computer's standard user controls, the operational controls of a VTR. These operational controls generally include "play", "stop", "pause", "rewind", "fast forward", "jog", "shuttle" (fast wind in either direction while replaying) etc.

For example, in one previously proposed system a standard Microsoft Windows 3.1 operating system "scroll bar" has been used to give an indication of the current temporal position within a sequence to be replayed. The user can move the scroll bar during replay to shuttle forwards or backwards through the sequence.

In another previously proposed system small versions of the standard VTR controls are reproduced as control buttons on the video screen, for operation by the user with a mouse or similar cursor control device (e.g. a trackerball or joystick).

It is a constant aim to make the user controls of systems such as computerbased replay controllers more efficient and easier to use.

SUMMARY OF THE INVENTION

This invention provides apparatus for controlling replay of video and/or audio material, the apparatus comprising:

cursor control means for providing user control of a cursor on the display screen;

selection control means for selecting an operation to be performed by the apparatus in dependence on the current position of the cursor on the display screen when the selection control means is activated by the user;

means for defining a shuttle control display screen area for use in controlling shuttle replay operation;

means for detecting an initial activation of the selection control means while the cursor is at an initial activation point within the shuttle control display screen area; and means, responsive to the detecting means, for controlling shuttle replay of the recorded material at a shuttle speed dependent on a current displacement on the display screen of the cursor from the initial activation point while the selection control means remains continuously activated after the initial activation.

The invention addresses the technical problem of using a computer-based user interface (e.g. the Microsoft Windows-type interface) to control the operations of a VTR. A particularly convenient control technique is employed in which, in embodiments of the invention, the user initiates a mouse "drag" operation by pressing and holding the mouse button anywhere within a shuttle control display area of the display screen. The speed of shuttle operation is then controlled by the computer to be dependent on the mouse cursor's current displacement (while the mouse button is held down) from the point on the screen at which the drag operation was started. When the mouse is then released, it is preferred that shuttle operation at that speed is maintained, although of course in other embodiments shuttle operation could be terminated when the button is released.

Thus, the area on the screen in which the user has to locate the cursor to initiate shuttle control can be made relatively large, since the accuracy of control does not depend on the precise screen cursor location at which the mouse button is first pressed (as it would if the user had to hit typical very small Windows "buttons" to select a shuttle speed), but simply on the subsequent displacement from that initial position. Especially where, for example, the computer is a portable or notebook computer (which typically has a relatively small and "laggy" screen making cursor positioning relatively difficult), this technical step can provide much greater accuracy of shuttle control by the user.

Separate screen areas could be provided to initiate forward and reverse shuttle control, but in an advantageously simple-to-use embodiment, the direction (as well as the displacement) of the cursor from the initial activation position is detected, and the direction of shuttle operation selected in dependence on that detection. For example, a horizontal component of the displacement of the cursor from the initial activation position could be detected; if that component is negative (i.e. the cursor is to the screen-left of its initial activation position) then reverse shuttle operation is selected; otherwise, forward shuttle operation is selected.

Although the invention would be very useful to control audio playback alone, it is preferred that the material to be replayed is video material (with or without accompanying audio material).

For further ease of use it is preferred that the display screen has a viewer area currently allocated (or pre-allocated) for displaying replayed video material, and that the shuttle control display screen area substantially coincides with that viewer area. This provides highly instinctive control for the user, in that the user first has to move the mouse cursor to the viewer area where he will see the shuttle-replayed video. The user then has only one screen area to concentrate on (the viewer area); the viewer are provides both the area on which the user sees the shuttling video pictures and the area for using the cursor to control the shuttle replay operation.

This also allows the range of shuttle speed available from a particular replay device currently under control to be used to scale the operation of the controlling means so that, for example, the full range of shuttle speed is represented by the movement of the cursor on the screen by a distance equal to the width of the viewer area.

This invention also provides audio and/or video replay apparatus comprising:

an audio and/or video storage device; and replay control apparatus as defined above.

This invention also provides a method of controlling replay of video and/or audio material, for use with an apparatus comprising cursor control means for providing user control of a cursor on the display screen; and selection control means for selecting an operation to be performed by the apparatus in dependence on the current position of the cursor on the display screen when the selection control means is activated by the user; the method comprising the steps of:

defining a shuttle control display screen area for use in controlling shuttle replay operation;

detecting an initial activation of the selection control means while the cursor is at an initial activation point within the shuttle control display screen area; and controlling shuttle replay of the recorded material at a shuttle speed dependent on a current displacement on the display screen of the cursor from the initial activation point while the selection control means remains continuously activated after the initial activation.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 2 is a schematic block diagram of an edit controller and associated video storage apparatus;

FIGS. 3a to 3c schematically illustrate source video files;

FIG. 3d schematically illustrates an edited output video sequence;

FIGS. 4a to 4c schematically illustrate the logical relationship between clip icons, an edit decision list and data representing source video files;

FIGS. 7a to 7c schematically illustrate different cursor types during a drag and drop operation;

FIGS. 8a and 8b schematically illustrate the use of the different cursor types;

FIG. 9 schematically illustrates a shuttle control operation in a viewer window of the display screen of FIG. 1; and FIG. 10 is a schematic graph of shuttle speed against cursor displacement.

DESCRIPTION OF THE PREFERRED EMBODIMENTS

Figure 1:
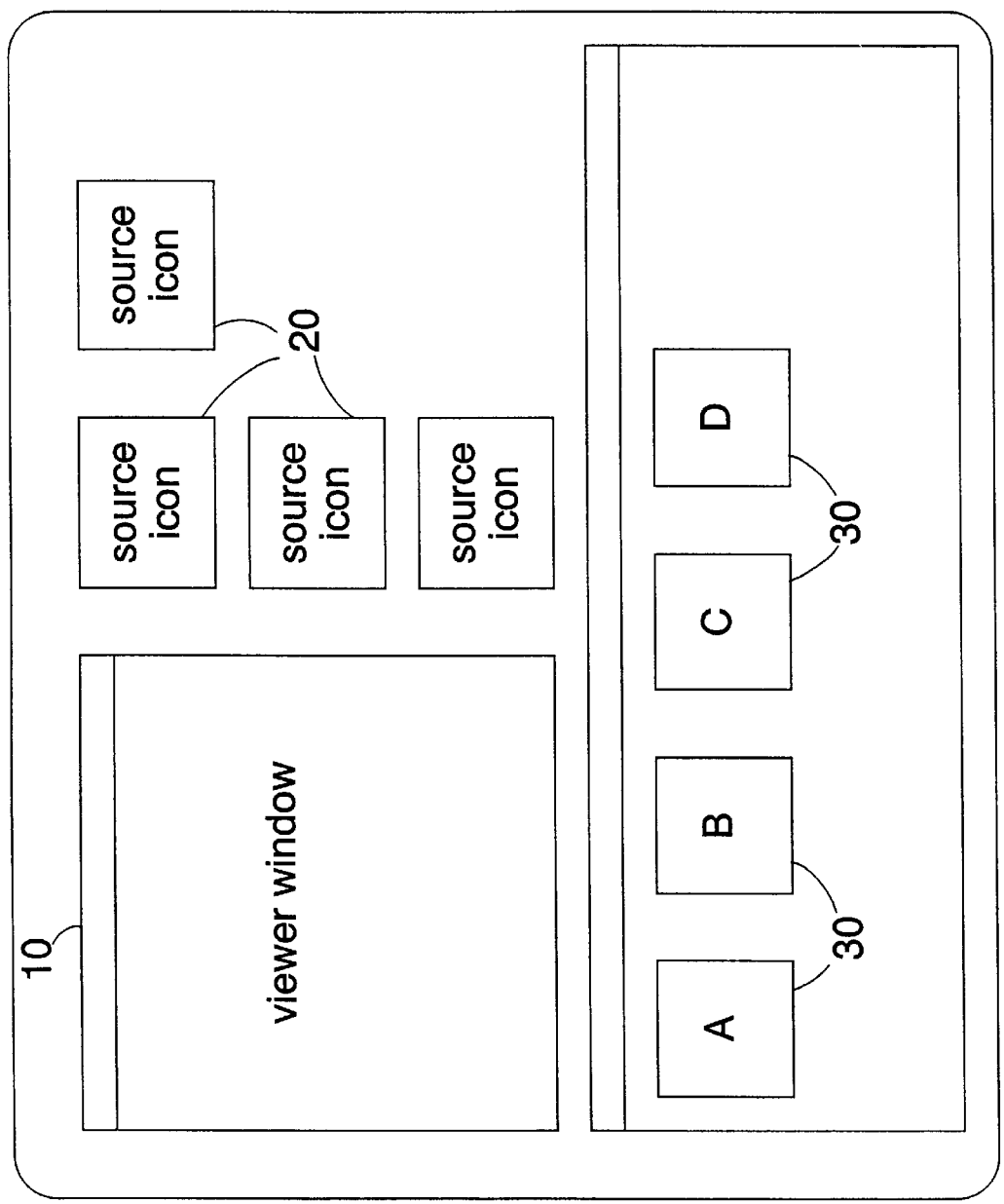
FIG. 1 is a schematic diagram of a display screen of an edit controller.

FIG. 1 is a schematic diagram of a display screen of an edit controller. The display screen will be described first to give an overview of the edit controller operation, and then the hardware and software underlying this will be described further.

In FIG. 1, a number of source video sequences are stored either on video tape or in a computer-based storage device such as a hard disk (in the present embodiment the video sequences are stored on a magneto-optical disk, but this will be described in more detail below).

The source sequences are registered with the edit controller, for example by the user indicating where on a video tape that source sequence can be found, or simply by the operation of the sequence being copied into the computer-based storage device.

The source video sequences are represented by source icons 20 in an upper area of the display screen. These source video sequences are then all available for editing by the user.

A viewer window 10 is provided for viewing a currently selected source (or output) video sequence. To view a source video sequence the user simply selects the corresponding source icon, for example by double-clicking (using a mouse cursor control device) on the icon. That source sequence can then be viewed in the viewer window, under the control of simulated video tape recorder controls such as play, stop, rewind etc. The replay operation can be stopped by a single mouse click within the viewer window. The viewer window can also be used to control shuttle operation, in a manner to be described further below.

When a portion of a source video sequence is selected by the user specifying an in-point and an out-point, that portion is represented in a lower, output area of the screen by a clip icon 30. In contrast to the source icons described above, where the order of display on the display screen simply related to the order in which the source sequences were registered or loaded, the order of the output icons 30 is important. In particular, the order (from left to right) of the icons on the screen represents the order in which the corresponding portions of video sequences will be replayed for the output edited sequence.

It is then possible for the user to re-order the clip icons to rearrange the order in which the clips are to be displayed in the edited output video sequence. In the present example, this can be achieved using the "drag-and-drop" mechanism similar to that which is standard to the Microsoft Windows version 3.1 operating system. Using this mechanism, the user can position the display screen cursor over a clip icon to be moved, and then press and hold the mouse button. If the cursor is then moved while the mouse button is pressed and held, the icon is "dragged" with the cursor to a new position. The mouse button is released to "drop" the clip icon at the new position.

For example, the clip icon 30B could be dragged and dropped to a position between the clip icons 30C and 30D. Thus, the order of the clip icons on the display screen would become ACBD and the output edited sequence would comprise clip A followed by clip C, clip B and finally clip D.

The output edited sequence can be viewed by the user as follows. If the user double-clicks on the clip icon 30A, then the whole of the portion A will be displayed, followed immediately by the whole of the portion B, then C and finally D. The composite sequence ABCD forms the edited output programme.

If the user wishes to preview only, say, a latter part of the edited output programme, he could double-click on the clip icon 30C, in which case replay would start from the beginning of clip C, to be followed immediately by clip D.

Further techniques for previewing the output sequence will be described below.

FIG. 2 is a schematic block diagram of the edit controller and associated video storage apparatus.

The edit controller comprises a personal computer (PC) 100 running the Microsoft Windows 3.1 operating system, the PC having a cursor control device 110 (e.g. a mouse), a display screen memory 120 and a display screen 130. The PC in the present embodiment is a notebook computer, the IBM "Thinkpad 760C", in which the PC 100, the cursor control device 110, video display screen memory 120 and the display screen 130 are all incorporated into a single portable unit. (In actual fact, the cursor control device 100 in the IBM Thinkpad is a joystick control device, but since this is set up to mimic the operation of a mouse, and an external mouse port is also available on this PC, the term "mouse" will be used for convenience as a generic term for a cursor control device in the following description.)

The PC 100 communicates with a video store controller 140 which in turn accesses video and audio data stored on a magneto-optical disc 150. In the present embodiment, the video store controller and the MO disc 150 are provided within a "docking station", i.e. a box of similar size to the IBM Thinkpad, on which the IBM Thinkpad may rest.

In operation, a video signal is supplied at an input port 160 of the video store controller and is subjected to a high degree of intra-picture data compression for storage on the MO disc 150. When one or more sections of source video have been stored on the MO disc 150, they can be manipulated by the user operating the edit controller to generate an edit decision list which is a list of time codes defining "inpoints" and "out-points" of the source material for successive portions of an output edited video sequence. The edit decision list can then be applied to the original video data as supplied to the video store controller 140, for broadcast or distribution.

FIGS. 3A to 3C schematically illustrate source video files, and FIG. 3D schematically illustrates an edited output video sequence. In all of FIGS. 3A to 3D, time is represented on a horizontal axis from left to right.

The output video sequence of FIG. 3D is formed of successive portions or clips of the source files of FIGS. 3B, 3A and then 3C. These are joined together contiguously by "cut" edits.

In use, in order to generate one of the clips from a source file, the user would replay that source file in the viewer window until a suitable in-point, $t_{in}$, was located. The user would operate a particular key or click on a cursor control on the screen (not shown). The user would then continue the replay of the source file until a suitable out-point was found, and then operate the appropriate control to define that out-point.

An entry in the edit decision list (see below) would then be created, along with a corresponding clip icon (see below). The newly created EDL entry and clip icon would be placed as a new temporally last item in the sequence of clips already prepared. However, this temporal order can easily be altered, as described below.

FIGS. 4A to 4C schematically illustrate the logical relationship between clip icons 30, an edit decision list (FIG. 4B) and data representing the source video files (FIG. 4A).

Each of the schematic boxes 200 in FIG. 4A represents a file header or directory entry for a file on the MO disc 150 corresponding to a section of source video. The directory entry includes file information such as a title, a starting time code and a finishing time code. Each such directory entry is associated with a single source icon 20 on the display screen of FIG. 1.

The boxes 210 of FIG. 4B schematically illustrate entries in an edit decision list. Each such entry relates to one contiguous portion of the output video sequence derived from a single one of the source video files. The entry contains information defining one of the source video files and a corresponding "Reel ID" defining the origin of the source file (e.g. a reel of video tape), an offset start variable defining the first picture of the sequence to be taken from that source video file, a duration variable defining the duration of the portion to be used from that source video file, and two compressed pictures: an in picture and an out picture. These compressed pictures are accessed from the data corresponding to their source file stored on the MO disc 150 when the EDL item is first created.

All of the times relating to in-points, out-points, offsets and durations are expressed in the standard video timecode format HH:MM:SS:FF (hours:minutes:seconds:frames)

The edit decision list for the example of FIGS. 3a to 3d therefore stores the following data:

| | |
|---|---|
| EDL item 1 | File ID: B |
| | Reel ID: reel 1 |
| | offset (B) |
| | duration (B) |
| | picture at $t_{in(B)}$ |
| | picture at $t_{out(B)}$ |
| EDL item 2 | File ID: A |
| | Reel ID: reel 2 |
| | offset (A) |
| | duration (A) |
| | picture at $t_{in(A)}$ |
| | picture at $t_{out(A)}$ |
| EDL item 3 | File ID: C |
| | Reel ID: reel 3 |
| | offset (C) |
| | duration (C) |
| | picture at $t_{in(C)}$ |
| | picture at $t_{out(C)}$ |
| . . . | | where duration(A) is equal to $(t_{out(A)} - t_{in(A)})$.

On replay of the output edited sequence, a linked list of storage locations on the disk is created by the PC and transmitted to the video store controller to define the frames necessary for the output edited sequence. This linked list is also stored on the disk so that it can be accessed later if required, even in a later editing session.

The same replay mechanism is used to replay a source file, in that a linked list of storage locations on the MO disk is derived by the PC 100 reference to the source file header and is transmitted to the video store controller, which then reads the frames at those storage locations in the appropriate order for replay. Shuttle replay is also possible by replaying the frames at a higher rate or by replaying only, say, 1 in n of the frames to achieve the desired shuttle speed.

To create the linked list of storage locations for an output edited sequence, first, the directory entry for file B is accessed and the starting timecode of file B is read from the directory entry. The offset variable, offset(B) is added to the starting timecode to calculate an in-point for this clip. The duration variable, duration(B) is added to the timecode of the in-point to calculate an out-point for the clip. The file address information stored in the directory entry (basically a linked list of data items or "clusters" on the MO disk 150) is accessed to determine which cluster holds the picture corresponding to the required in-point. The appropriate cluster for the inpoint picture is specified as the first cluster for the current clip, and, following the existing linked list of clusters defined by the directory entry, successive storage locations are defined until the out-point for that clip is reached.

When the out-point for file B is reached, the process is repeated for the next clip (from file A in this example), and so on.

The linked list of storage addresses corresponding to the output edited sequence is referred to as a "virtual" file, and it can be replayed without further reference to the directory entries to the source files. Replay can be started at a point within the virtual file by simply cueing to the appropriate number of frames along the linked list of storage locations.

Referring to FIGS. 4a to 4c, therefore, each of the directory entries 200 corresponds to and defines the position on the MO disk 150 of a source video file. Each of the EDL items 210 corresponds to and defines an output clip, with reference to the directory entry 200 for the source file containing that clip.

In addition, each EDL item 210 corresponds to a respective clip icon 30 (as shown in FIG. 4c). The display order of the clip icons 30 from left to right (and into second and subsequent rows from left to right if required) in turn defines the order of the EDL items in the linked list of EDL items. The way in which this is achieved will be described below.

As mentioned above, the clip icons can be re-ordered by a drag-and-drop mechanism. To do this, the user moves the cursor onto one of the clip icons and presses and holds the mouse button. Then, as long as the mouse button remains held down, that clip icon (or at least a representative schematic outline of it) is "dragged" with the cursor. Wherever the dragged icon is on the screen when the mouse button is released then defines a new position of that clip icon.

In fact, in common with many existing uses of the drag-and-drop type of mechanism, the dragged icon in this system is not allowed to drop into any position in the output area of the screen. Instead, it is constrained to fall to a position on a defined grid of possible positions so that the resulting pattern of icons is equally spaced and without any missing icons, in horizontal rows from top left to bottom right. (This feature may be seen when program icons are moved within a program group under program manager in Microsoft Windows 3.1, with the "auto arrange icons" option enabled).

At the end of a drag-and drop operation, if the order of the clip icons has been changed, then the assignments between the child windows and the EDL items are correspondingly altered.

The above features are achieved by the way in which a computer programme is written to run under the Microsoft Windows 3.1 operating system. Many of the basic techniques necessary for an understanding of this are described in the book, "Programming Windows 3.1", Charles Petzold, Microsoft Press, third edition, 1992, which is incorporated herein by reference.

The EDL items and directory entries are maintained as normal variable structures in a conventional way. The directory entries in fact form a linked list, but this is not important to the present techniques.

The output area is a window, and the clip icons are so-called "child windows" operating under the parent window of the output area. Thus, although the clip icons appear to be just small icon-like graphical images, they do have some additional functionality as child windows themselves. So, in this description, the word "icon" is used in a broad sense to mean a graphical representation of a windows program and/or a piece of audio or video material, in so far as selecting, clicking on or moving the icon on the screen has an effect on the corresponding program or piece of audio or video material.

One such child window (clip icon) exists for each entry in the EDL. When the child window is painted or repainted by the Windows operating system, it displays either the in-picture or the out-picture from that EDL item. The choice of which of the two pictures is displayed is left to the user, through cursor buttons on the child window (not shown).

When the user clicks or double-clicks on a child window, Windows sends a message to that child window. In the case of a replay operation, a double click on a child window causes the child window program to communicate the location of the click or double click to the parent window, which in turn initiates replay of the video material corresponding to the selected child window.

Figure 5:
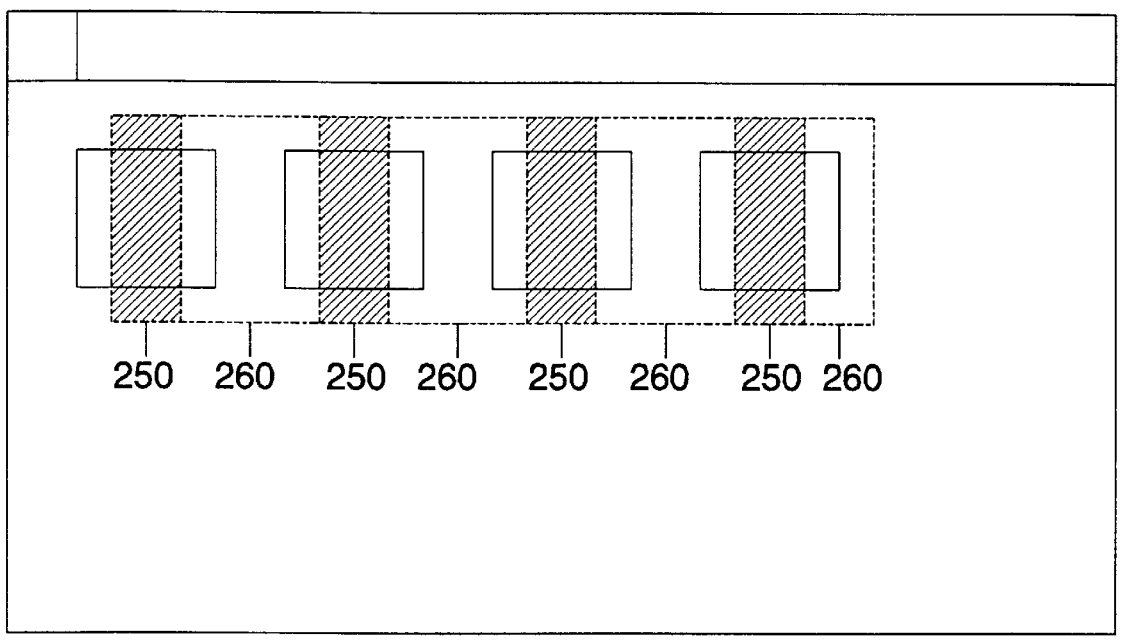
FIG. 5 schematically illustrates cursor mapping within an output area of the display screen of FIG. 1.

FIG. 5 schematically illustrates cursor mapping within an output area of the display screen of FIG. 1. The output area surrounding the clip icons is notionally divided into first regions 250 overlying a central area of each clip icon, and second regions When a double click of the mouse button is detected, the coordinates of the mouse cursor at that time (which are passed to the parent window either directly or via the child window, depending on whether the mouse cursor is within a child window at the time) are compared with coordinate ranges defining the first and second regions 250, 260.

If the cursor coordinates are within one of the first regions 250, then the video replay is initiated by the parent window from the start of the clip corresponding to the clip icon under that first region 250.

If the cursor coordinates are within a second region 260, then the parent window initiates video replay from the clip immediately to the left of the selected region 260, but from a predetermined time before the end of the clip. For example, the predetermined time might be 3 seconds before the end of that clip, but preferably this period can be set by the user. This allows the edit transition between that clip and the next to be reviewed by the user.

The time at which to start (or cue up) replay is calculated as follows:

> replay start timecode=starting TC for output (virtual) file+lengths of preceding clips (if any)+duration of current clip−predetermined time period However, if the duration of the clip is less than the predetermined time period, replay is initiated from the start of the clip.

Figure 6:
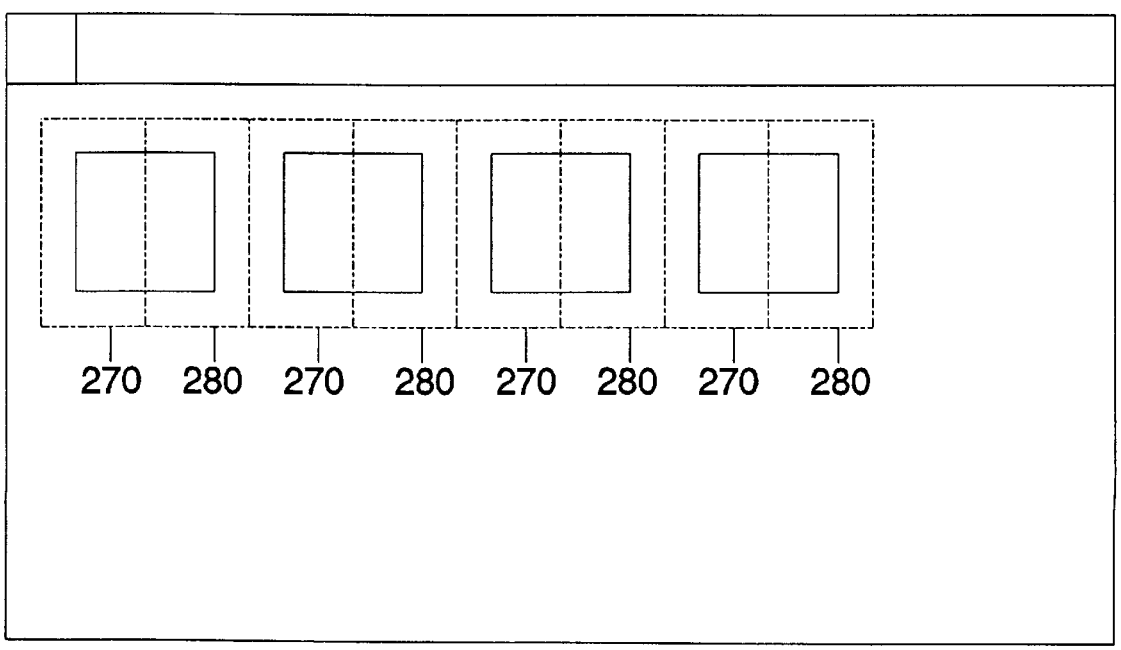
FIG. 6 schematically illustrates a second type of cursor mapping within the output area of the display screen of FIG. 1.

FIG. 6 schematically illustrates a second type of cursor mapping within the output area of the display screen of FIG. 1. Here, further regions are notionally defined by ranges of cursor coordinates, for use during a drag-and-drop operation.

During such an operation, the cursor coordinates (in the parent window) are continuously (repeatedly) checked against coordinate ranges defining "left" regions and "right" regions 280 about each clip icon. In the example shown, one left region and one right region overlie each clip icon, and so during the drag and drop operation if the cursor is detected to be in either of those two regions, it is thereby detected that is the nearest icon to the current cursor position.

The left and right regions can then be used to detect and indicate which side of the detected nearest icon the dragged icon would fall, if released then. Basically, if the cursor is in a left region, the dragged icon would fall to the left of the detected nearest icon. If the cursor is in a right region, the dragged icon would fall to the right of the detected nearest icon.

This detection can then be used to display an indication of which side of the detected nearest icon the dragged icon will fall.

FIGS. 7a to 7c schematically illustrate different cursor types during a drag and drop operation.

When the cursor is in a left region 270, the cursor is changed (using a standard Windows cursor change routine) to the cursor of FIG. 7a. Similarly, when the cursor is in a right region, the cursor is changed to the cursor of FIG. 7b. The cursor of FIG. 7c indicates that the cursor is in neither a left nor a right region (and indeed it may be outside the parent window), and so it is not a valid place to drop the dragged icon. If the icon is dropped there, then it is either dropped at the end of the existing icon order (if still within the parent window) or the order of the icons in the parent window will not change (if outside the parent window).

FIGS. 8a and 8b schematically illustrate the use of the different cursor types.

In FIG. 8a, the cursor is slightly to the left of an underlying clip icon 30, and so the left arrow cursor is displayed to give a clear indication to the user that the dragged icon will fall to the left of the underlying icon. Similarly, the situation is reversed in FIG. 8b. Thus a clear indication is given to the user of which side the dragged icon will fall.

In an alternative embodiment, the arrow-like indication could be placed over the detected nearest icon, rather than using a modification of the cursor itself.

FIG. 9 schematically illustrates a shuttle control operation in a viewer window of the display screen of FIG. 1, and FIG. 10 is a schematic graph of shuttle speed against cursor displacement.

When the cursor is placed within the viewer window and the mouse button clicked and held, the viewer window initiates shuttle replay of the video material currently associated with the viewer window (depending on the last icon selected by the user, this could be an output clip or a source file).

In fact, this is defined as a two-stage process. When the mouse button is first pressed within the viewer window, (whether or not it is subsequently held down), the Windows "mouse down" message causes the Viewer window to issue a "stop" command to stop replay. Then, if the mouse button has not been released within a predetermined time (e.g. 0.5 seconds), as detected by recording the Windows timer at the time of the first mouse down message, shuttle operation is selected. Alternatively, if a double click is detected (i.e. a release and then a second click within a predetermined time) normal speed replay is initiated by the viewer window.

The viewer window temporarily "captures" the mouse as long as the button is held down—a standard Windows technique. The coordinates in the viewer window of the point at which the mouse button is first clicked $(x_I, y_I)$ are stored, and the coordinates of the cursor at intervals thereafter $(x_C, y_C)$ are compared with $(x_I, y_I)$.

The shuttle speed is set to be dependent on the current value of:

$$|X_C - X_I|$$

i.e. on the horizontal component 302 of the distance 300 from the initial activation point to the current cursor position. However, this value does not in itself specify the shuttle speed; instead, there is a generally exponential relationship between the horizontal displacement component and the shuttle speed up to a maximum shuttle speed, as illustrated schematically in FIG. 10. This relationship is achieved by the value $|X_C - X_I|$ actually providing an index into a look-up table (e.g. in read-only-memory) defining shuttle speed values in response to different horizontal displacement component values.

The look-up table values can be selected or scaled so that a distance equal to, say, the width of the viewer window causes shuttle operation at the maximum available shuttle speed for the replay device being controlled.

As a further check, if $X_C > X_I$ then the cursor is now to the right of its initial position, and so forward shuttle operation is selected. Otherwise, reverse shuttle operation is selected. Thus, the sign of $|X_C - X_I|$ dictates the direction of shuttle operation.

When the mouse button is released, shuttle operation is maintained at the currently selected shuttle speed and direction. Shuttle operation can then be stopped by a single mouse click within the viewer window, which causes the "stop" command to be issued as mentioned above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for controlling replay of video and/or audio material, said apparatus comprising:

a cursor controller for providing user control of a cursor on the display screen;

a selection controller for selecting an operation to be performed by said apparatus in dependence on a CuITent position of said cursor on said display screen when said selection controller is activated by said user;

means for defining a shuttle control display screen area for use in controlling shuttle replay operation;

a detector for detecting an initial activation of said selection controller while the cursor is at an initial activation point within said shuttle control display screen area; and a shuttle controller, responsive to said detector, for controlling shuttle replay of recorded material at a shuttle speed dependent on a displacement on said display screen of said cursor from said initial activation point while said selection controller remains continuously activated after said initial activation, said cursor controller providing said displacement of said cursor on said display screen in a direction of 360 degrees with respect to said initial activation point;

wherein said shuttle controller is operable to vary the shuttle speed as an exponentially rising function of said cursor displacement from said initial activation point.

2. Apparatus according to claim 1, comprising:

another detector for detecting a component of the cursor displacement along a predetermined direction; and a direction controller for controlling the direction of shuttle operation in dependence on said detected displacement component.

3. Apparatus according to claim 2, comprising a speed controller for controlling the speed of shuttle operation in dependence on said detected displacement component.

4. Apparatus according to claim 2, in which said predetermined direction is a horizontal screen direction.

5. Apparatus according to claim 1, in which said material to be replayed comprises video material.

6. Apparatus according to claim 5, comprising means for defining a viewer area on said display screen for displaying replayed video material.

7. Apparatus according to claim 6, in which said shuttle control display screen area and said viewer display screen area substantially fully overlap one another.

8. Apparatus according to claim 1, in which said shuttle controller is responsive to a maximum shuttle speed of a replay apparatus to be controlled, so that the maximum shuttle speed of that replay apparatus is obtained by a cursor displacement of a predetermined distance on the screen.

9. Apparatus according to claim 1, in which:

said cursor controller comprises a mouse, trackerball or joystick; and said selection controller comprises a mouse button, a trackerball button or a joystick button respectively.

10. Audio and/or video replay apparatus comprising:

an audio and/or video storage device;

a cursor controller for providing user control of a cursor on the display screen;

a selection controller for selecting an operation to be performed by said apparatus in dependence on a current position of said cursor on said display screen when said selection controller is activated by said user;

means for defining a shuttle control display screen area for use in controlling shuttle replay operation;

a detector for detecting an initial activation of said selection controller while the cursor is at an initial activation point within said shuttle control display screen area; and a shuttle controller, responsive to said detector, for controlling shuttle replay of recorded material at a shuttle speed dependent on a displacement on said display screen of said cursor from said initial activation point while said selection controller remains continuously activated after said initial activation, said cursor controller providing said displacement of said cursor on said display screen in a direction of 360 degrees with respect to said initial activation point;

wherein said shuttle controller is operable to vary the shuttle speed as an exponentially rising function of said cursor displacement from said initial activation point.

11. A method of controlling replay of video and/or audio material, for use with an apparatus comprising a cursor controller for providing user control of a cursor on said display screen; and a selection controller for selecting an operation to be performed by said apparatus in dependence on a current position of said cursor on said display screen when said selection controller is activated by the user; said method comprising:

defining a shuttle control display screen area for use in controlling shuttle replay operation;

detecting an initial activation of said selection controller while said cursor is at an initial activation point within said shuttle control display screen area; and controlling shuttle replay of the recorded material at a shuttle speed dependent on a displacement on said display screen of said cursor from said initial activation point while said selection controller remains continuously activated after said initial activation, with the shuttle speed being varied as an exponentially rising function of said cursor displacement from said initial activation point, and said displacement of said cursor on said display screen is provided by said cursor controller in a direction of 360 degrees with respect to said initial activation point.

* * * * *

UNITED STATES PATENT AND TRADEMARK OFFICE
CERTIFICATE OF CORRECTION

PATENT NO.    : 6,342,902 B1
DATED         : January 29, 2002
INVENTOR(S)   : Harradine et al.

It is certified that error appears in the above-identified patent and that said Letters Patent is hereby corrected as shown below:

<u>Column 10,</u>
Lines 11-12, replace "CulTent" with -- current --.

Signed and Sealed this

Sixth Day of August, 2002

*Attest:*

JAMES E. ROGAN
*Attesting Officer*     *Director of the United States Patent and Trademark Office*